Feb. 21, 1956  YOSHIKAZU DOI  2,735,339
WIDE ANGLE HIGH APERTURE FIVE COMPONENT PHOTOGRAPHIC OBJECTIVE
Filed Sept. 14, 1954
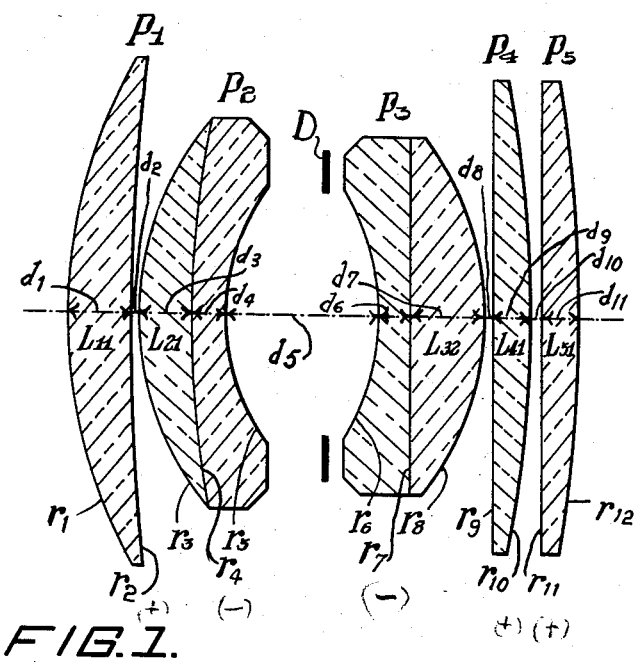
FIG.1.
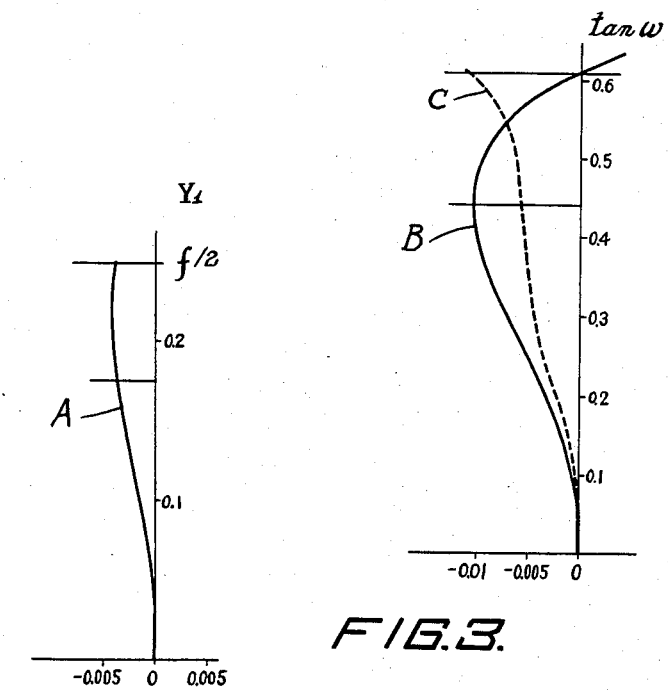
FIG.2.
FIG.3.

United States Patent Office 2,735,339
Patented Feb. 21, 1956

2,735,339
WIDE ANGLE HIGH APERTURE FIVE COMPONENT PHOTOGRAPHIC OBJECTIVE

Yoshikazu Doi, Odawara City, Japan, assignor to Fuji Photo Film Co., Ltd., Minami-Ashigaramachi, Ashigarakami-gun, Kanagawa Prefecture, Japan, a company of Japan Application September 14, 1954, Serial No. 455,847

Claims priority, application Japan January 12, 1954

2 Claims. (Cl. 88—57)

This invention relates to lenses and more particularly to wide angle lenses.

It is known that a combination of two glasses, a large one and a small one in refractive index for the d line N and the Abbe number V, can improve adaptability in the formation of a lens for the correction of chromatic aberration as well as aberration of field curvature. There is, however, a great deal of complexity about the question of how to utilize this adaptability effectively in order to obtain good results, in the correction of various abberations and thus to improve the performance of a lens.

In accordance with the present invention, the above mentioned problem is solved by using a new optical glass having large indices N and V. More particularly, an objective of the invention comprises five components $P_1$, $P_2$, $P_3$, $P_4$ and $P_5$, each suffix of those symbolic letters being numbered from the side of the object, separated by air of which the first, the fourth and the fifth components consist of a single positive lens respectively. The second and the third components forming respectively a meniscus convex toward the object and the image plane, and consist of respectively two single lenses cemented together. The composition is so arranged that the equivalent focal length of the whole lens system denoted by $f'_e$ has the following relation:

$$2.1 < \frac{f'_e}{r_3} < 2.7; \quad 0.70 < \left|\frac{d_5}{r_5}\right| < 0.80; \quad 0.63 < \left|\frac{d_5}{r_6}\right| < 0.75$$

$$0.1 < \left|\frac{d_3+d_4}{f'_e}\right| < 0.15; \quad 2.2 < \left|\frac{f'_e}{r_8}\right| < 2.8$$

and $$0.13 < \left|\frac{d_6+d_7}{f'_e}\right| < 0.17$$

At the same time the refractive index of the medium for the d line, comprising two or more positive single lenses, exceeds 1.70. It thus becomes possible to easily design a wide angle lens with a high aperture of F:2.0 and a particularly high degree of correction of the aberration up to 63°.

The embodiment of the present invention is illustrated, by way of example, in the accompanying drawings, wherein:

Fig. 1 is a side section of a wide angle high aperture objective designed in accordance with the invention;

Figs. 2 and 3 respectively show the abberation curves for the objective mentioned above.

As shown in Fig. 1, the air space $d_5$ between the second and the third components $P_2$ and $P_3$ is sufficiently extended in proportion to the radii of curvature $r_5$ and $r_6$ of the associated refractive surfaces, thus restraining the spherical aberration and/or wing shape aberration in oblique pencil, and the resultant weakening in correction of astigmatism is compensated for by the fourth and the fifth components $P_4$ and $P_5$, and also by setting the effective limits to the thicknesses $(d_3+d_4)$ and $(d_6+d_7)$ of the second component $P_2$ and the third component $P_3$ and the radii of curvature $r_3$ and $r_8$ The following table illustrates parameters of the component elements in accordance with the invention. In Fig. 1, new optical glass SK22 is used for $L_{21}$ and $L_{32}$, and new glass BaSF8 is used for $L_{11}$, $L_{41}$ and $L_{51}$, the refractive index of these three positive single lenses being greater than 1.70.

F : 2.0   field angle : 63°   $f'_e = 0.9000$

| Lens Surface | r (Radii) | d (Thicknesses and Separations) | N' | V' |
|---|---|---|---|---|
| 1 | $r_1=$ 0.6684 | $d_1=.078$ | 1.7234 | 38.0 |
| 2 | $r_2=$ 2.347 | $d_2=.010$ | | |
| 3 | $r_3=$ 0.3730 | $d_3=.078$ | 1.6779 | 55.5 |
| 4 | $r_4=$ 1.206 | $d_4=.034$ | 1.6727 | 32.2 |
| 5 | $r_5=$ 0.2732 | $d_5=.202$ | | |
| 6 | $r_6=$ −0.2979 | $d_6=.034$ | 1.6727 | 32.2 |
| 7 | $r_7=$ 5.814 | $d_7=.098$ | 1.6779 | 55.5 |
| 8 | $r_8=$ −0.3672 | $d_8=.010$ | | |
| 9 | $r_9=$ −333.3 | $d_9=.050$ | 1.7234 | 38.0 |
| 10 | $r_{10}=$ −1.400 | $d_{10}=.010$ | | |
| 11 | $r_{11}=$ 20.000 | $d_{11}=.050$ | 1.7234 | 38.0 |
| 12 | $r_{12}=$ −1.8022 | | | |

In the table, numerals in the first column designate the refractive surfaces numbered from the side of the object and r is the radius of curvature, the + and − signs designating that surfaces are respectively convex and concave towards the object, and d, N', V' and $f'_e$ refer respectively to the thickness or space, the refractive index for the d line, the Abbe number and the focal length of the objective.

Figure 4 shows the characteristic curve A of the spherical aberration of a photographic objective in accordance with the invention: $Y_1$ indicates the incident height of a light. Figure 3 shows the stigmatism characteristic curves B and C of the sagittal image surface and the tangential image surface of the objective respectively; ω indicates the incident angle of a principal ray.

As shown in Figs. 2 and 3, the status of correcting aberrations for the objective in the embodiment indicates that the remaining amount of aberrations is almost equal to that produced in F:3.5 and the excellent correction in oblique pencil is disclosed as a result of computation.

What is claimed is:

1. A wide angle high aperture objective comprising five components $P_2$, $P_2$, $P_3$, $P_4$ and $P_5$, each suffix of those symbolic letters being numerated from the side of the object, separated by air of which the first, the fourth and the fifth components $P_1$, $P_4$ and $P_5$ consist of a single positive lens respectively, while the second and the third components $P_2$ and $P_3$ forming respectively meniscus convex toward the object and the image plane consist respectively of two single lenses cemented together, characterized in that the equivalent focal length of the whole lens system denoted by $f'_e$ has the following relation:

$$2.1 < \frac{f'_e}{r_3} < 2.7; \quad 0.70 < \left|\frac{d_5}{r_5}\right| < 0.80; \quad 0.63 < \left|\frac{d_5}{r_6}\right| < 0.75$$

$$0.1 < \left|\frac{d_3+d_4}{f'_e}\right| < 0.15; \quad 2.2 < \left|\frac{f'_e}{r_8}\right| < 2.8$$

and $$0.13 < \left|\frac{d_6+d_7}{f'_e}\right| < 0.17$$

and the refractive index for the d line of the medium comprising at least more than two positive single lenses exceeds 1.70.

2. A wide angle high aperture objective comprising five components $P_1$, $P_2$, $P_3$, $P_4$ and $P_5$, each suffix of those symbolic letters being numerated from the side of the object, separated by air of which the first, the fourth and the fifth components $P_1$, $P_4$ and $P_5$ consist of one positive lens respectively, while the second and the third component $P_2$ and $P_3$ forming respectively meniscus convex toward to the object and the image plane consist respectively of two single lenses cemented together, characterized in that the relation of value $f'_e = 0.9000$ is shown in the following table:

F : 2.0    field angle : 63°    $f'_e = 0.9000$

| Lens Surface | $r$ (Radii) | $d$ (Thicknesses and Separations) | N' | V' |
|---|---|---|---|---|
| 1 | $r_1 =$ 0.6684 | | | |
| | | $d_1 = .078$ | 1.7234 | 38.0 |
| 2 | $r_2 =$ 2.347 | | | |
| | | $d_2 = .010$ | | |
| 3 | $r_3 =$ 0.3730 | | | |
| | | $d_3 = .078$ | 1.6779 | 55.5 |
| 4 | $r_4 =$ 1.206 | | | |
| | | $d_4 = .034$ | 1.6727 | 32.2 |
| 5 | $r_5 =$ 0.2732 | | | |
| | | $d_5 = .202$ | | |
| 6 | $r_6 =$ −0.2979 | | | |
| | | $d_6 = .034$ | 1.6727 | 32.2 |
| 7 | $r_7 =$ 5.814 | | | |
| | | $d_7 = .098$ | 1.6779 | 55.5 |
| 8 | $r_8 =$ −0.3672 | | | |
| | | $d_8 = .010$ | | |
| 9 | $r_9 =$ −333.3 | | | |
| | | $d_9 = .050$ | 1.7234 | 38.0 |
| 10 | $r_{10} =$ −1.400 | | | |
| | | $d_{10} = .010$ | | |
| 11 | $r_{11} =$ 20.000 | | | |
| | | $d_{11} = .050$ | 1.7234 | 38.0 |
| 12 | $r_{12} =$ −1.8022 | | | | wherein numerals in the first column designate the refractive surfaces numbered from the side of the object and $r$ is the radius of curvature, the + and − signs designating that surfaces are respectively convex and concave towards the object, and $d$, N', V' and $f'_e$ refer respectively to the thickness or space, the refractive index for the $d$ line, the Abbe number and the focal length of the objective.

References Cited in the file of this patent

UNITED STATES PATENTS

| | | |
|---|---|---|
| 2,019,985 | Lee | Nov. 5, 1935 |
| 2,379,392 | Warmisham | June 26, 1945 |
| 2,379,393 | Wynne | June 26, 1945 |
| 2,398,680 | Warmisham | Apr. 16, 1946 |

FOREIGN PATENTS

| | | |
|---|---|---|
| 647,830 | Germany | July 14, 1937 |